March 9, 1926.　　　　　　　　　　　　　　　　1,576,160
H. W. TOBEY
LINE WELDING MACHINE
Filed April 11, 1924　　3 Sheets-Sheet 1
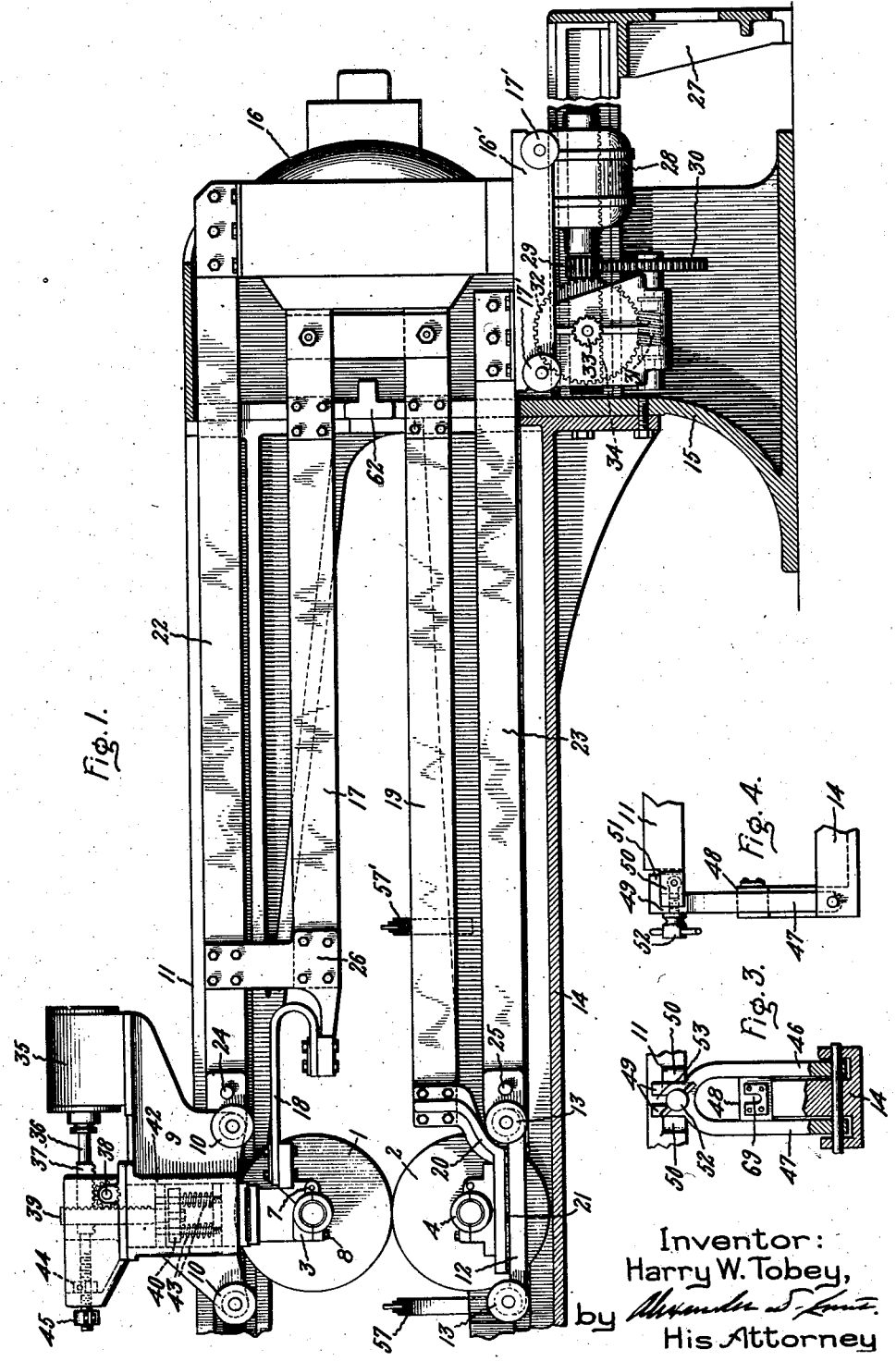
Inventor:
Harry W. Tobey,
by
His Attorney March 9, 1926.  
H. W. TOBEY  
LINE WELDING MACHINE  
Filed April 11, 1924  
1,576,160  
3 Sheets-Sheet 2
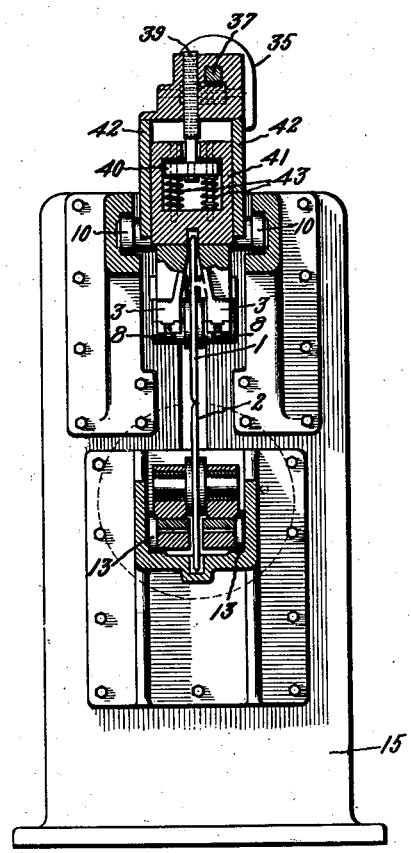
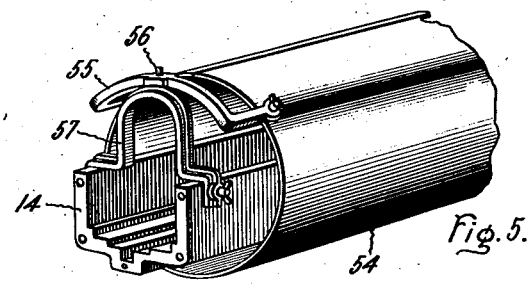
Inventor:
Harry W. Tobey,
by
His Attorney March 9, 1926. 1,576,160
H. W. TOBEY
LINE WELDING MACHINE
Filed April 11, 1924   3 Sheets-Sheet 3
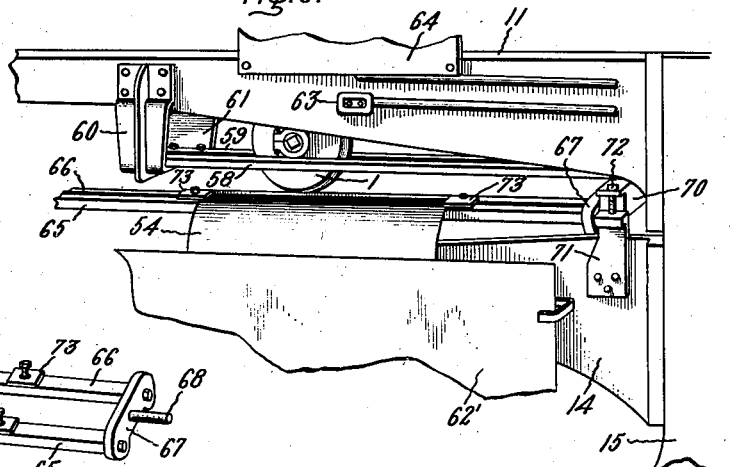
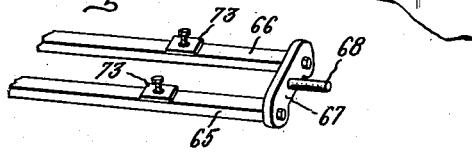
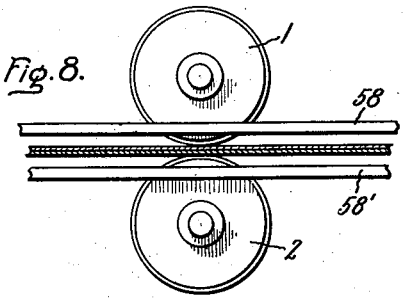
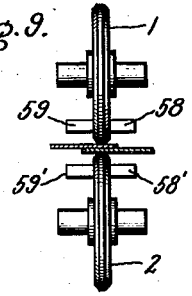
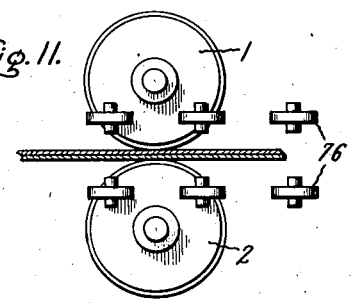
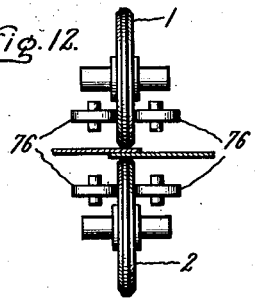
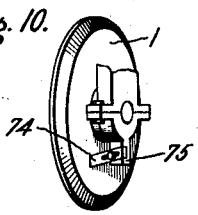
Inventor:
Harry W. Tobey
by *His Attorney*

Patented Mar. 9, 1926.

1,576,160

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

LINE-WELDING MACHINE.

Application filed April 11, 1924. Serial No. 705,940.

*To all whom it may concern:*

Be it known that I, HARRY W. TOBEY, a citizen of the United States, residing at Pittsfield, in the county of Berkshire, State of Massachusetts, have invented certain new and useful Improvements in Line-Welding Machines, of which the following is a specification.

My invention relates to electric welding and particularly to machines for line welding by what is commonly called the resistance process.

In the resistance process the work to be welded is heated by an electric current passed therethrough. In line or seam welding by this process the welding current may be conducted through the work by a pair of electrodes in disc form which roll along the work and force against one another the overlapped edges of the sheets to be welded together.

My invention is especially designed for welding the longitudinal seams of drums or tanks but is adapted to weld such seams or joints in flat work.

An object of my invention is to provide a simple and rugged machine adapted to stand the strains of regular operation on relatively heavy stock without permitting the parts to bind or get out of alignment. A further object is to provide an improved arrangement for maintaining the electrode discs in alignment without the production of forces tending to spring or distort the discs laterally. A further object is to provide an arrangement for applying pressure to the electrodes which will maintain an even and readily adjustable pressure, which will enable the electrodes to be operated simply and quickly to permit removal and insertion of the work, and enable the pressure used on one weld to be exactly duplicated on successive welds without skill on the part of the operator.

My invention will be better understood from the following description taken in connection with the accompanying drawings, and its scope will be pointed out in the appended claims.

In the accompanying drawings, Figs. 1 and 2 are respectively side and end views of a welding machine with certain parts broken away and certain parts shown in section; Figs. 3 and 4 are end and side views of a clamping yoke for the arms of the machine; Fig. 5 shows in perspective an arrangement of work holding clamp; Fig. 6 shows with certain parts broken away, a welding machine of the same general character as the machine of Fig. 1 provided with electrode guide bars; Fig. 7 shows the work holding arrangement of Fig. 6; Figs. 8 and 9 are side and end views showing a guide bar arrangement; Fig. 10 is a perspective view of an electrode showing a modified construction of guiding means, and Figs. 11 and 12 are side and end views of a further modification of guiding means.

Referring to Figs. 1 and 2 of the drawings, the electrode discs are shown at 1 and 2. The upper electrode disc 1 is supported in bearings 3 which are arranged on each side of the disc. The lower electrode 2 is similarly supported in bearings 4. In order to enable the electrode discs to be readily taken out and replaced, these bearings are split. Referring to the upper electrode of Fig. 1, the lower half of the bearing is pivoted at 7 and the two parts of the bearing are clamped together by the bolt 8 which is arranged to swing through a slot in the outer end of the pivoted half of the bearing. Upon loosening the bolt 8 it can be swung forward through the slot and the lower half of the bearing will swing down about the pivot 7 so that the electrode may be removed. Each bearing is similarly constructed. The bearings of the upper disc 1 are supported from a carriage 9 provided with rollers 10 arranged to move along guide ways in the upper arm 11 of the machine. The bearings of the lower disc 2 are supported by a carriage 12 provided with rollers 13 arranged to move along guide ways in the lower arm 14 of the machine. The arms 11 and 14 are parallel and extend laterally from the supporting frame 15 of the machine. These arms are indicated as bolted to the supporting structure 15.

Current is supplied to the electrode discs 1 and 2 from a transformer 16. One side of the secondary of the transformer 16 is connected by means of the copper bar 17 and flexible conductor 18 to the bearing 3 of the upper electrode. The other side of the secondary is connected to the copper bar 19 and connection 20 which may be rigid. The lower half of the bearing block of the lower electrode is bolted down upon the connection 20. The bearing blocks are preferably made of copper. Suitable insulation is provided for insulating the bearing blocks from the carriages, such insulation on the lower carriage being indicated at 21. Rigid bars 22 and 23 are bolted to the transformer frame. By means of these bars the carriages 9 and 12 are caused to move along the arms 11 and 14. The bars 22 and 23 are pivotally connected to the carriages at 24 and 25 so that the carriages may move freely without binding. The upper bar 22 serves to support the outer end of the copper bar 17 by means of a plate 26 bolted to the bars 22 and 17 and suitably insulated from one of these bars.

The transformer 16 is mounted on a carriage 16′ provided with rollers 17′ which move along a track supported at one end on the support 15 and at the other end on a support 27. The back of the support 15 is open so that the transformer with the bars 17, 19, 22 and 23 can move into and out of the support. To move the transformer and electrode discs along the line of the weld a motor 28 is mounted on the carriage 16′, and this motor, through a pinion 29 and gear 30, drives a worm 31 and worm wheel 32 on the shaft of which is a pinion 33 which engages a fixed rack 34. As thus arranged, rotation of the motor 28 causes the carriage 16′ to move and traverse the electrode discs along the line of the weld.

In order to permit the work to be inserted and removed, means are provided for raising and lowering the upper electrode disc. This means is supported on the upper carriage 9 and comprises a compressed air cylinder 35, the piston rod 36 of which operates a rack 37, which through a pinion on the shaft 38, operates a rack 39 secured to a member 40 mounted in a box-like structure 41 (see Fig. 2) which carries the bearings for the upper electrode and slides in the member 42. When pressure is applied to one end of the cylinder 35, the member 40 moves down and compresses springs 43 and forces the electrode disc 1 toward electrode disc 2. The rollers 10 transmit to the arm 11 the reaction due to the pressure exerted upon the work and engage the upper surfaces of the guide ways in the arm 11 when the electrodes are thus forced together. These rollers 10 engage the lower surfaces of the guide ways in the arm 11 when the electrode 1 is raised. A stop nut 44 on the piston rod 36 limits the downward movement of the member 40. By adjusting this nut the compression of the springs 43 may be adjusted to any desired degree. It is apparent that with any given adjustment of the nut 44 the same pressure will always be applied and this pressure will be maintained uniform independently of variations in the pressure of the air which is supplied to the cylinder 35. The nut 44 may be made as a split nut, provided with a screw for clamping it in any position to which it may be turned. When pressure is applied to the other side of the piston to raise the electrode disc 1, the springs 43 expand and after member 40 engages the top of member 41 further movement of the member 40 lifts the electrode disc. The extent of this lifting movement may be adjusted by adjusting the nut 45 which may be clamped in any position of adjustment. It is apparent that with the construction described, the bearings are moved and the pressure is applied in a right line normal to the work and passing through the center of the disc. The arrangement including the pivotal connections 24 and 25 between the carriages 9 and 12 and the bars 22 and 23 permits an equalization of the pressure between the guide ways and the rollers on each carriage. It is also apparent that the upper electrode may be quickly raised or lowered by a simple control valve arranged to admit air to one end or the other of the cylinder 35, and that the pressure used on one weld may be exactly duplicated on successive welds without care or skill on the part of the operator.

The arms 11 and 14 in which the carriages move may be made of cast iron, but for large machines it is desirable to make these members of non-magnetic material of suitable strength, for example, bronze or other suitable alloys. This is desirable to reduce the reactance of the welding circuit. For the same reason it is desirable to make the pushing and pulling bars 22 and 23 also of non-magnetic material.

The pressure between the electrodes tends to spring the outer ends of the arms 11 and 14 apart and the drawing of the rollers across the work at times produces forces tending to spring the arms laterally with reference to one another. It is therefore desirable to provide a yoke for clamping the outer ends of the arms 11 and 14 together in such a way that they can neither separate nor move laterally with respect to each other. A suitable arrangement of clamping yoke is indicated in Figs. 3 and 4. The lower arms 46 and 47 of the yoke are pivoted to the lower arm 14 of the machine and are finished on the inside to engage the sides of a block 48 also secured to the lower arm 14. The upper end of the yoke is provided with a part 49 which is finished to engage between lugs 50 on the upper arm 11 of the machine. The upper part of the yoke is also provided with a lug or catch 51 which engages over a shoulder on the arm 11. The yoke is shown clamped in place by a nut 52 threaded on a bolt pivoted to the upper arm 11 and arranged to swing through a suitable slot 53 to release the yoke. When it is desired to insert or remove the work, the nut 52 is loosened and the bolt swung out of the notch, after which the yoke may be swung outwardly out of the way. When the work has been inserted the yoke is clamped in place. The catch 51 prevents separation of the arms 11 and 14 and the engagement of the yoke between the lugs 50 and on either side of the block 48 prevents relative lateral movement of the arms. It is preferable to provide suitable insulation in this end-tie yoke arrangement since the arms of the machine with the end-tie yoke otherwise form a circuit in which currents may be induced by reason of the currents flowing in the bars 17 and 19.

Where the machine is very large, it is desirable to provide a suitable support under the outer end of the lower arm 14. Such a support may be pivoted to the floor and arranged to be swung down out of the way in order to enable a drum or tank to be readily slipped over the lower arm. Fig. 5 shows such a drum or tank in place on the lower arm.

Referring to Fig. 5, it will be observed that the drum 54 to be welded is held by a clamp 55 slipped over pin 56 projecting from a member 57 clamped to the lower arm 14. Clamps 57 and 57' are shown in Fig. 1. The clamps 57 and 57' may be secured anywhere along the arm 14 to hold a tank of any length within the capacity of the machine as determined by the lengths of the arms 11 and 14. In the arrangement shown the support for the work is arranged to permit the tank to rock slightly about the line of the weld. This manner of supporting the work to permit rocking is not essential where the work is quite thin but is very desirable in relatively heavy work since it permits of welding over slight irregularities in the work without so great a pressure between the electrodes as would otherwise be necessary and without subjecting the electrodes to such severe distorting forces. This arrangement of mounting the work is claimed in my copending application, Serial No. 656,731, filed August 10, 1923, apparatus for resistance line welding, assigned to the same assignee as the present application.

To operate the machine the operator places the drum or tank to be welded over the lower arm, moves the electrode discs to one end of the seam to be welded and turns on the air to force the electrode discs together and compress the work therebetween. He then completes the circuit of the motor 28 which traverses the electrodes along the line of the weld and completes the circuit of the transformer 16. When the electrodes reach the other end of the seam to be welded the circuit of the transformer is opened, the travel stopped and air admitted to separate the electrodes. The work is then removed and a new piece of work inserted and a weld made in the reverse direction. If desired, the work may be tacked at one or more points before the line weld is made. This may not be necessary unless the clamps do not hold the work securely or the work is of great length. In order to tack the weld it is merely necessary to force the electrodes together and turn on the current momentarily in the spot where a weld is desired. The electrodes may then be separated and moved along to the position where it is desired to make another tack weld. The line weld may then be run.

It is desirable to water-cool the electrode discs in a line welding machine and this may be done by directing streams of water upon the electrodes but inasmuch as such cooling means has nothing to do with the present invention, the drawing is not complicated by illustration thereof.

The electrode discs of line welding machines are generally made of copper, which material possesses a number of well known desirable characteristics. The edges of the copper electrode discs are preferably beveled so that the body of the disc is thicker than the width of the line of the weld. In this way the disc can be given a fair degree of rigidity to resist lateral stresses which tend to spring or distort the disc out of its true plane and the contact edge of the disc is also thereby somewhat reinforced so that the edge does not need to be dressed down so frequently. It is, however, necessary to dress the discs occasionally and this somewhat changes their diameter. To compensate for the change in diameter of the discs, the nut 44 on the piston rod 36 of Fig. 1 is adjusted. The work holding clamps are also adjusted so as to keep the plane of the line of the weld in the plane at which the electrode discs meet each other. When the diameter of the discs has decreased by repeatedly redressing, it is desirable to raise the lower electrode disc 2 and this may be simply done by blocking up the bearing by inserting copper plates or blocks between the lower half of the bearing and the connection piece 20 which leads to the lower conductor 19.

During welding the pressure on the electrode discs causes the edges of the discs to sink slightly into the surface of the metal being welded. During the movement of the electrode discs along the work strong forces are at times produced tending to bend or distort the electrode discs laterally. These side stresses can be successfully withstood by rigidly constructing the arms 11 and 14 of the machine and tying the outer ends together as I have heretofore described, but the forces are at times so great as actually to distort the electrode discs out of true and furthermore they produce objectionable pressures between the axles of the electrodes and the bearings in which they turn. In order to overcome these difficulties I provide means arranged to engage the side faces of the electrode discs on the work side of the axis of each disc. To avoid complication of the drawing, such guiding means for the electrodes are not shown in Fig. 1 but are shown in Fig. 6.

Referring to Fig. 6, the welding machine illustrated is of the same character as the machine shown in Fig. 1. The upper and lower arms 11 and 14 correspond to the same arms in Fig. 1 and the tank 54 to be welded is shown supported on a modified form of work holding means. The guiding means for preventing lateral distortion of the electrode discs are shown in cooperative relationship to the upper electrode disc 1. This guiding means is shown in Fig. 6 as comprising a pair of guiding bars 58 and 59 rigidly supported at their outer ends by brackets 60 and 61 secured to the upper arm 11. The bars are supported in any convenient way at their inner ends as, for example, to a cross piece on the support 15, which cross piece is shown at 62 in Fig. 1. This cross piece should be made of non-magnetic metal. It is also desirable to make the bars 58 and 59 of non-magnetic metal; for example brass or Monel metal may be used. These bars 58 and 59 are located in correct alignment with the guide ways in the arms 11 and 14 and bear against the side faces of the electrode discs. The arrangement of the guide bars is simply shown in Figs. 8 and 9 wherein the guide bars for the lower electrode disc 2 are shown at 58' and 59'. The guide bars are suitably insulated in any desired manner. For example, the outer ends of the guide bars may be insulated by providing insulation between the brackets 60 and 61 and the supporting arm 11. The inner ends may be insulated in substantially the same manner. These guide bars, being relatively close to the edge of each disc, greatly strengthen the disc against lateral distortion and relieve pressure on the bearings which would otherwise be due to side stresses. It is apparent that the arrangement of the rigidly supported arms 11 and 14 with their guide ways for the carriages and the guide bars for the elecetrode discs cooperate to produce a machine in which the electrode discs will maintain proper alignment, even where welding heavy stock, and maintain such alignment without subjecting the electrodes to lateral distorting forces.

In Fig. 6 the member 62' indicates a sheet of material, the lower side of which may extend to a trough located at the base of the machine so that the circulating water, which cools the electrode discs, may be caught and returned by a circulating pump not shown in the drawing. In Fig. 6 the push button switch 63 is for starting and stopping the motor for driving the pump for circulating the cooling water. The panel, a part of which is shown at 64 in Fig. 6, may carry the control valve for the air cylinder and the control switches for the welding current and for the motor which drives the electrode discs along the line of the weld.

A regulator may be provided for regulating the value of the welding current. One form of regulator which is commonly used with welding machines is an induction regulator in the primary circuit of the transformer and such regulator may be automatically controlled to maintain the current substantially constant. It is satisfactory, however, to use a regulator which is not automatic in its action and provide a control switch on the panel 64 for remote control of the regulator. The operator by watching the color at the point of welding can determine quite accurately whether the current needs adjustment and if such adjustment be necessary he can move the control switch on the panel to operate the motor which adjusts the regulator one way or the other to increase or decrease the welding current as may be desired.

The work holding clamp shown in Fig. 6 is more clearly indicated in Fig. 7. It comprises a pair of bars 65 and 66, the ends of which are connected by cross pieces one of which is shown at 67. A spindle 68 projects from this cross piece in the line of the seam to be welded. The spindles 68 may be supported in bearings at the outer and inner ends of the machine. Where a work holding clamp of this character is used with the machine of Fig. 1, the bearing for the outer spindle may be supported on the lower arm 14, as indicated at 69 in Fig. 3. As there shown, the bearing plate 69 is slotted to permit the spindle to be dropped into place. The supports for the spindle 68 will be made so that they can be raised and lowered to bring the line of the weld into the plane of the meeting edges of the electrode discs, suitable adjustment being made whenever the electrode discs are dressed down. In Fig. 6 the support for the spindle which extends from the inner end of the cross piece 67 is indicated as a cross member 70 supported by brackets on each side of the lower arm 14, one of which brackets is shown at 71. The member 70 may be adjusted vertically by suitable means, a bolt for this purpose being shown at 72. It is desirable to make the members 67 and 70 of non-magnetic metal since they are located at the throat of the machine where the magnetic field is relatively strong. It is also desirable to make the work holding bars 65 and 66 of non-magnetic metal. Any suitable devices may be provided for clamping the work to the bars 65 and 66. As indicated in Figs. 6 and 7, this clamping means may consist of pieces 73 arranged to be bolted down to clamp the work.

The slotted bearing arrangement for the work holding device not only permits the work holding device to be dropped into place readily, as heretofore described, but also allows the work to float upon the lower electrode disc. This arrangement provides means for always maintaining proper contact between the lower electrode and the underside of the drum which is being welded without undue pressure from the upper electrode disc. If such vertical or floating movement were not provided for, it might in some cases be necessary to spring the drum out of shape somewhat in order to enable the upper electrode to press the work firmly against the lower electrode. A similar result is secured in the arrangement of Fig. 1 in which the work holding clamp can float to a certain extent upon the pins in the supporting members 57 and 57′. In either arrangement the work is held in the proper alignment for welding and at the same time undue pressures tending to distort the electrode discs are avoided by reason of the floating as well as the rocking adjustability of the work holding device.

A modification of the guiding means for preventing lateral distortion of the electrode discs is shown in Fig. 10. As there shown, this guiding means comprises a shoe or roller 74 adjustably clamped to a projection 75 extending from the bearing for the electrode disc. With this arrangement, the guiding means is carried by the bearing and travels with the electrode disc instead of being stationary as in the arrangement of Fig. 6.

Figs. 11 and 12 show a further modified construction of electrode guiding means comprising a plurality of rollers 76 supported in any suitable manner so as to engage the side surfaces of the electrode discs as they move along the line of the weld.

It is apparent that the application of guiding means for preventing lateral distortion of the electrodes in accordance with my invention is not limited to machines in which the electrodes move and the work remains stationary, but is also applicable to any machine in which relative motion between the work and the electrode discs is produced by movement of the work. In such case it is possible to provide the electrode guiding means on the work holding mechanism where such mechanism is constructed to maintain a true line of travel as the work moves relatively to the electrode discs.

What I claim as new and desire to secure by Letters Patent of the United States is:—

1. A line welding machine comprising an electrode disc for conducting welding current into the work, a bearing in which the disc is rotatably mounted, a carriage for supporting said bearing, means carried by said carriage for moving said bearing to force said disc into engagement with the work or disengage it from the work, an arm provided with guide ways, rollers on said carriage arranged to move in said guide ways to support and guide the carriage and transmit to said arm the reaction due to pressure upon the work and means for moving said carriage along said arm comprising a bar pivotally connected to said carriage.

2. A line welding machine comprising an electrode disc for conducting welding current into the work, a bearing on each side of said disc in which the disc is rotatably mounted, a carriage for supporting said bearings, fluid pressure operated means carried by said carriage for moving said bearings to force said disc into engagement with the work or disengage it from the work, said means being arranged to move said bearings and exert pressure upon said disc in a right line normal to the work and through the center of the disc, an arm provided with guide ways, means on said carriage cooperating with said guide ways to support the carriage in said arm and transmit to said arm the reaction due to pressure upon the work, means for moving said carriage along said guide ways and means arranged to permit the carriage to equalize the pressure between said guide ways and the means on the carriage cooperating with the guide ways.

3. A line welding machine comprising a support, a pair of parallel arms projecting laterally from said support, a carriage supported in guide ways in each of said arms, an electrode disc carried by each of said carriages, said electrode discs being arranged to engage opposite sides of the work and compress the work therebetween, a transformer and connections therefrom for supplying current to said electrode discs, bars secured to the frame of said transformer projecting along said arms and respectively connected to said carriages and means for moving said transformer relatively to said support whereby said bars move said carriages along said arms and move said electrode discs along the line of the weld.

4. A welding machine comprising an electrode for pressing against and conducting current into the work to be welded, means for moving said electrode into and out of engagement with the work and forcing it against the work comprising a fluid pressure operated member, adjustable means for limiting the movement of said member in the direction to exert pressure upon the work, and means comprising a spring for transmitting pressure from said member to said electrode whereby a given pressure upon the work will be produced upon operation of said member to its limit of movement and whereby the pressure upon the work may be adjusted and maintained substantially constant independently of variations in the pressure of the fluid operating said member.

5. A line welding machine comprising an electrode disc for conducting welding current into the work, a carriage for supporting said electrode disc, an arm provided with guide ways along which said carriage is arranged to move to traverse said electrode disc along the line of the weld, means carried by said carriage for raising and lowering said electrode disc and pressing the same against the work, guide bars supported by said arm and arranged to engage the side faces of said electrode disc to prevent lateral distortion thereof, said guide bars being arranged to engage said disc between the axis thereof and the work whereby said electrode disc may be raised and lowered between said guide bars.

6. A line welding machine comprising a rotatable electrode disc for conducting welding current into the work and for exerting pressure thereupon, and means arranged to engage a side face of said disc on the work side of the axis of the disc only and prevent lateral distortion thereof.

7. A line welding machine comprising a rotatable electrode disc for conducting welding current into the work and for exerting pressure thereupon, bearings for supporting said disc with its axis at right angles to the line of the weld, and means in addition to said bearings to engage a side face of said disc on the work side of the axis of the disc and prevent lateral distortion thereof.

8. A line welding machine comprising a rotatable electrode disc for conducting welding current into the work and for exerting pressure thereupon and guiding means arranged along the line of the weld to engage the side faces of said disc on the work side of the axis thereof and prevent lateral distortion thereof.

9. A line welding machine comprising a rotatable electrode disc for conducting welding current into the work and for exerting pressure thereupon and a pair of guide bars arranged along the line of the weld to engage the side faces of said disc on the work side of the axis thereof and prevent lateral distortion thereof.

10. A line welding machine comprising a rotatable electrode disc for conducting welding current into the work and for exerting pressure thereupon, a carriage supporting a bearing in which the disc is mounted to rotate, an arm provided with guide ways along which the carriage is arranged to be moved and guide bars supported by said arm and arranged to engage the side faces of said disc on the work side of the axis thereof and prevent distortion thereof.

11. A line welding machine comprising a pair of rotatable disc electrodes for conducting current into the work and for exerting pressure thereupon, means for producing relative movement between the electrodes and the work along the line of the weld and means comprising a rocking and floating device for maintaining the work in proper alignment for welding while permitting the work to adjust itself during relative movement between the electrodes and work along the line of the weld.

12. A line welding machine comprising a pair of rotatable disc electrodes for conducting current into the work and for exerting pressure thereupon and means for producing relative movement between the electrodes and the work along the line of the weld, characterized by the fact that a floating work holding device is provided for maintaining the work in proper alignment for welding.

13. A line welding machine comprising a support, a pair of parallel arms projecting laterally from said support, a pair of rotatable disc electrodes for conducting current into the work and for exerting pressure thereupon mounted for movement along said arms, a work holding device comprising a spindle at each end thereof and means for supporting said spindles to maintain the work in proper alignment for welding comprising a slotted bearing secured to one of said arms whereby the work may float for the purpose described.

14. A line welding machine comprising a support, a pair of parallel arms projecting laterally therefrom, electrode discs for conducting current into the work and for exerting pressure thereupon supported by said arms respectively, and a tie yoke for securing the outer ends of said arms together comprising means for preventing vertical and lateral distortion of said arms as the electrodes and work move relatively along the line of the weld.

15. A line welding machine comprising an electrode disc for exerting pressure upon and conducting current into the work, a support provided with a pair of arms projecting laterally therefrom, means for mounting said electrode disc for movement along one of said arms, a cooperating electrode mounted on the other arm, and means for securing the outer ends of said arms together comprising a device pivoted to one arm, said device and said arms being provided with cooperating parts to prevent vertical and lateral distortion of said arms during welding.

16. A line welding machine comprising a support, a pair of parallel arms projecting laterally therefrom, electrodes for conducting current into the work and for exerting pressure thereupon supported by said arms respectively, means for securing said arms against separation comprising a bifurcated member pivoted to one of said arms and having means to engage the other arm, said bifurcated member and said arms being provided with interlocking lateral surfaces arranged to prevent relative movement laterally between said arms.

In witness whereof, I have hereunto set my hand this ninth day of April, 1924.

HARRY W. TOBEY.